United States Patent Office 3,782,965
Patented Jan. 1, 1974

3,782,965
PROCESS FOR PRODUCING COFFEE EXTRACT
Martin S. Colton, Tarrytown, and Marvin Schulman, Monroe, N.Y., assignors to General Foods Corporation, White Plains, N.Y.
No Drawing. Filed May 15, 1972, Ser. No. 253,067
Int. Cl. A23f 1/08
U.S. Cl. 426—432    3 Claims

ABSTRACT OF THE DISCLOSURE

A process for producing coffee extract by contacting an aqueous extraction liquid with progressively fresher roasted and ground coffee in the extraction columns of a percolator set wherein the aqueous extraction liquid is defoamed using nonchemical means prior to passing it through the extraction column containing the freshest roasted and ground coffee. The coffee extract drawn-off from the extraction column containing the freshest coffee remains substantially defoamed and the process also results in higher coffee solids yields for the overall extraction process.

BACKGROUND OF THE INVENTION

This invention relates to soluble coffee and more particularly to a process for producing coffee extract.

In the standard comercial method for producing coffee extract, a percolator set is used containing from about five to eight extraction columns connected in series wherein roasted and ground coffee is extracted by a countercurrent flow of aqueous extraction liquid and coffee through the percolator set. The aqueous extraction liquor is generally heated and fed to the entrance of the extraction column containing the most spent (most extracted) roasted and ground coffee and the aqueous liquid then flows successively through extraction columns containing progressively fresher roasted and ground coffee thereby increasing in coffee solids concentration. Coffee extract is drawn off from the extraction column containing the least extracted or freshest roasted and ground coffee, hereinafter referred to as the fresh stage. The coffee extract generally contains about 20% to 35% coffee solids by weight of the extract and is then further processed into soluble coffee powder.

After each draw-off of coffee extract, the extraction column containing the most spent coffee is taken off-stream and a column of fresh coffee is placed on-stream thus becoming the column from which coffee extract is drawn-off in the next succeeding cycle. (Cycle is the time between successive draw-offs of coffee extract from the fresh column.) The extraction liquid is then fed to the extraction column containing the most spent coffee, this coffee being the next most spent coffee from the preceding cycle, and the extraction is continued. A given bed of coffee within an extraction column, then, becomes progressively more spent in each succeeding cycle.

A problem experienced in soluble coffee processing is the presence of foam in the coffee extract which is drawn-off from fresh stage extraction column. This foam is extremely stable and causes many processing difficulties. The prior art methods of reducing or eliminating this foam generally are performed on the drawn-off coffee extract, and generally result in the loss of some desirable aromatic components. Also, prior art techniques employing chemical additives as defoaming agents, such as described in U.S. Pat. 3,436,227, are undesirable due to the undesirability of employing foreign compounds in the coffee product.

SUMMARY OF THE INVENTION

It has been found that defoamed coffee extract may be prepared by degassing or defoaming the aqueous extraction liquid of the percolation process using non-chemical means prior to passing it through the fresh stage of the percolator set. The process of this invention also results in higher yields of soluble coffee solids for the overall percolation process and reduced pressure drops throughout the system. Generally, by degassing is meant the elimination of entrapped air or gases in the extraction liquid generally believed to be the cause of foam formation in the coffee extract when the extract is drawn-off from the last extraction column of the percolator set. The discharge of the coffee extract and the corresponding pressure change is believed to result in the release of the entrapped or occluded air and gases in the form of a foam or froth. Since the extraction liquid also experiences cooling and pressure drops as it passes through each successive extraction column, some foam may be present during the percolation process. Defoaming, then, is generally intended to include methods of removing a foam already present. Depending upon the particular conditions at which the extraction is performed, the extraction liquid may require degassing if foam has not yet formed, defoaming if a foam is already present, or both. As used hereinafter, the term "defoamed extraction liquid" is intended to describe an extraction liquid which has either been degassed, defoamed, or both. Hence, the term "defoaming" as hereinafter used is intended to describe the variety of methods which result in an extraction liquid having little or no foam present, whether the method be aimed at removing gases which cause foam, removing an already formed foam, or a combination of these methods.

By non-chemical means is meant those methods of defoaming not involving the use of a chemical additive to either inhibit foam formation or to break an existing foam. Such methods may generally be broadly classed as mechanical or electrical, or combinations of these. An important element of this invention is the finding that the effects of using non-chemical means to defoam the extraction liquid of the percolation process are carried through to the drawn-off coffee extract thereby eliminating the necessity for further defoaming prior to drying. This result is of course desirable since it does not require using non-coffee additives in the coffee product.

The defoamed aqueous extraction liquid is passed through the fresh stage thereby contacting the fresh roasted and ground coffee contained therein and a predetermined quantity of coffee extract is drawn off after this contacting operation. The coffee extract is substantially defoamed thus eliminating the need for further defoaming prior to processing the coffee extract into soluble coffee powder.

Further, it has also been found that increased yields are achieved for the overall extraction process. The yield from the percolation process is defined as the percentage of coffee solids in the coffee extract based on the dry solids in the column containing the freshest or least extracted roasted and ground coffee. Increased yields are, of course, desirable since recovery of more of the available coffee solids present in the roasted and ground coffee results in a more economical overall process.

The process of this invention involves contacting roasted and ground coffee with an aqueous extraction liquid in a percolator set. The percolator set is a series of extraction columns connected by manifolding means to permit the flow of aqueous extraction liquid to pass into a column, through the column, and out of the column into the next adjacent column.

The extraction columns contain roasted and ground coffee of varying degrees of extraction. The aqueous extraction liquid is usually heated and fed to the entrance of the extraction column containing the most extracted roasted and ground coffee. The exiting liquid from this column contains relatively few soluble coffee solids. This liquid then passes through the next adjacent extraction column containing the next most extracted roasted and ground coffee. The extraction liquid then flows continuously through the successive extraction columns, containing progressively less extracted roasted and ground coffee, the liquid increasing in soluble coffee solids concentration as it passes through the system of extraction columns. After passing through the extraction column containing the freshest roasted and ground coffee, a pre-determined quantity of the aqueous extraction liquid is drawn-off as coffee extract having a concentration of soluble coffee solids, generally, of about 20%–35%. This draw-off marks the completion of a cycle.

The extraction liquid, as it passes through successive extraction columns, entraps air which lead to foam formation in the drawn-off coffee extract. This foam may hamper efficient drying of the coffee extract due to plugging of spray-drying nozzles, pumps, and other like problems. Also, if the foam is carried through the drying process, it may contribute to the foam which appears when the dried powder is reconstituted resulting in a coffee brew of unacceptable appearance.

The foaming problem has been found also to have a detrimental effect on the extraction of roasted and ground coffee. Extraction liquid containing dispersed gases or foam is a less efficient extraction medium and poorer contact with the roasted and ground coffee within a column results in a loss of soluble coffee solids. This problem is particularly critical when the columns containing the least extracted or freshest roasted and ground coffee are being extracted. Here, with more coffee solids available for recovery, inefficient extraction is uneconomical. Such extraction liquid also results in larger pressure drops across the columns further decreasing the efficiency of the extraction operation.

DETAILED DESCRIPTION OF THE INVENTION

The key to this invention is the finding that a substantially defoamed coffee extract draw-off, increased extraction yields for the percolation process and reduced pressure drops across the percolator set may be achieved by defoaming the aqueous extraction liquid using non-chemical means prior to passing it through the fresh stage extraction column of the percolator set. Defoaming during the percolation process effects the retention of many of the aromatic components which are lost when defoaming is performed on the drawn-off coffee extract. Further, the defoamed extraction liquid provides a more efficient contacting medium for the coffee resulting in the increased recovery of available coffee solids and reduced pressure drops across the percolation system."

As previously stated, "defoaming" is intended to be descriptive of the methods employed to achieve an extraction liquid substantially free of foam and thus encompasses both degassing and foam removal techniques. Generally, the prior art techniques used in producing a defoamed coffee extract are performed on the coffee extract itself after being drawn-off from the last column of the percolator set. Methods found suitable for defoaming may generally be broadly categorized as either chemical or non-chemical means. The chemical means involve the addition of a chemical compound to the coffee extract in order to inhibit foam formation or to break a pre-existing foam. These chemical methods may cause problems, when used during the percolation process, with decomposition or alteration of the compound in the relatively high temperatures of the percolation process. However, with the proper compound, addition may be made at a point during the production of the coffee extract since the chemical and its effects are carried through the process resulting in a defoamed coffee extract.

In the process of this invention, however, it has been found that defoaming the aqueous extraction liquid of the percolation process by use of non-chemical means results in a coffee extract which remains substantially defoamed. This result is surprising in that the carry-through of the defoaming operation to the final drawn-off coffee extract is unexpected when non-chemical defoaming techniques are employed. Further, the process of this invention requires no non-coffee additives which is, of course, desirable.

Examples of the non-chemical methods which may be employed in the process of this invention are broadly mechanical methods, electrical methods, or combinations of these. Generally, the mechanical methods, due to the relative ease of incorporating such techniques into the percolation process are the preferred embodiments. Such methods may include the application of a vacuum to remove foam and gases from the liquid, the application of pressure to solubilize the dispersed gases and any foam present, beating an already present foam with mechanical means or steam, decantation methods wherein the extraction liquid is withdrawn from the bottom of a holding tank leaving the foam behind applying heat to the foamy extract, other like methods, or combinations of these. Electrical methods, such as the application of sonic energy, described in U.S. Pat. 2,975,056 may also be empolyed.

The extraction liquid to be defoamed is preferably withdrawn to a holding tank or other like vessel for the particular operation. However, continuous defoaming methods may also be employed.

The aqueous extraction liquid is defoamed prior to passing it into the fresh stage extraction column, that is, the extraction column from which coffee extract is drawn-off. In the preferred embodiment of this invention, the extraction liquid is defoamed after exiting from the next freshest stage of the percolator set (the column containing the next freshest coffee in the set), that is, at a point just prior to entering the fresh stage extraction column. Defoaming at such a point is desirable since, as already mentioned, it is found that defoamed extraction liquid is a more efficient extraction medium than untreated liquid. Thus, more efficient extraction of the freshest coffee in the set results in increased yields for the overall percolation process. Also, the coffee extract drawn-off from the fresh stage contains little or no foam. However, the defoaming of the extraction liquid may also be performed just prior to passing the extraction liquid into the next freshest stage of the percolator set. Again, more efficient extraction of the fresher coffee results in higher yields for the overall process.

It is found that defoaming at a point earlier than just before the next freshest stage may result in the presence of an undesirable amount of foam in the drawn-off coffee extract thereby necessitating further defoaming prior to processing the extract into soluble coffee powder by either spray-drying, freeze-drying, or other suitable means. Thus, as used herein, deforming prior to passing through the fresh stage is intended to encompass defoaming just prior to passing through the fresh stage or just prior to passing through the next freshest stage.

After the defoamed extraction liquid is passed through the fresh stage extraction column, a pre-determined quantity of coffee extract is drawn-off from this column. It s found that the coffee extract remains substantially defoamed to such a degree that further defoaming of the extract prior to passing it to the drying operation is not essential.

After drawing-off the coffee extract, and thus completing a cycle, a new cycle is begun by taking the extraction column containing the most spent coffee off-stream. The heated aqueous extraction liquid is then fed to the column containing the most spent coffee in the preceding cycle, and the extraction process is continued as the extraction liquid contacts successively fresher coffee. Just prior to entering either the fresh stage or next freshest stage, the extraction liquid is defoamed. The defoamed extraction liquid then passes through the fresh coffee, and a quantity is drawn-off as coffee extract and processed into soluble coffee powder by some suitable drying method. The next cycle is starting as described above and the operation continues such that a given charge of fresh coffee becomes progressively less fresh in each succeeding cycle.

While the above description employs changing cycles by taking columns off-stream and placing fresh columns on-stream, the start of a successive cycle may also be performed by discharging the column containing the most spent roasted and ground coffee at the end of a cycle and charging it with fresh coffee, this column thus becoming the fresh extraction column for draw-off of coffee extract in the succeeding cycle.

The aqueous extraction liquid, while preferably water, may be any water solution of salts or other solids, such as soluble coffee solids. The extraction liquid in general may be heated to anywhere between about 220° F. and 370° F., and inter-column heating or cooling to heat or cool the extraction liquid prior to passing it through an extraction column may also be employed. It should be noted, of course, that this invention is applicable to both decaffeinated and undecaffeinated coffee extract.

The following example is illustrative of the process of this invention.

EXAMPLE I

In a control run, a six column percolator set was used to extract roasted and ground coffee with an aqueous extraction liquid. At equilibrium operation, the fresh extraction column was loaded with 8600 gms. of roasted and ground coffee. Feed water was heated to 350° F. and passed upward through the first extraction column, containing the most spent coffee. The extraction liquid continued to pass throughout the remaining extraction columns containing progressively fresher coffee, and 16,400 gms. of coffee extract was taken off from the column containing the fresh roasted and ground coffee, at a temperature of about 73° F. The coffee extract was excessively foamy and the yield, over an average of 24 cycles, was about 50% on a dry basis. The pressure drop across the columns was about 50–75 p.s.i.

A second run was made employing identical conditions, coffees, draw-off weight, and temperatures. Just prior to passing into the extraction column containing the fresh roasted and ground coffee, the extraction liquid was defoamed by discharging it into a holding tank at 212° F. and atmospheric pressure to break up the foam. The defoamed extraction liquid was then passed into the fresh column and the coffee extract draw-off was practically free of foam. The average yield over 24 cycles was 55% on a dry basis and the pressure drop across the columns was 30 p.s.i.

While the invention has been described according to the specific examples set forth above, they are intended to be illustrative only, and it will be apparent that various changes and modifications may be made without departing from the scope of this invention.

We claim:

1. In a method of producing coffee extract by countercurrently contacting an aqueous extraction liquid with progressively fresher roasted and ground coffee in the extraction columns of a percolator set and wherein said extraction liquid is fed to the extraction column containing the most spent roasted and ground coffee and drawn off as a coffee extract from the extraction column containing the freshest roasted and ground coffee, the improvement comprising defoaming said aqueous extraction liquid by nonchemical means after passing through said extraction column containing the most spent roasted and ground and prior to passing it through the extraction column containing the freshest roasted and ground coffee to achieve a substantially defoamed coffee extract.

2. The method of claim 1 wherein said aqueous extraction liquid is defoamed after exiting from the extraction column containing the next freshest roasted and ground coffee and prior to passing through the extraction column containing the freshest roasted and ground coffee.

3. The method of claim 2 wherein said defoaming of said aqueous extraction liquid is achieved using mechanical methods.

References Cited

UNITED STATES PATENTS

| | | | |
|---|---|---|---|
| 3,100,151 | 8/1963 | Breivik et al. | 99—71 |
| 2,975,056 | 3/1961 | Lombardi | 99—71 |
| 3,142,572 | 7/1964 | Miller et al. | 99—71 |
| 3,420,673 | 1/1969 | Guggenheim | 99—71 |
| 3,436,227 | 4/1969 | Bergeron et al. | 99—71 |
| 3,620,756 | 11/1971 | Strobel et al. | 99—71 |

FRANK W. LUTTER, Primary Examiner

W. L. MENTLIK, Assistant Examiner